United States Patent Office 2,704,243
Patented Mar. 15, 1955

2,704,243
METHOD OF DEFOLIATION

Frank J. Seibert, Bound Brook, N. J., assignor to Chipman Chemical Company, Inc., Bound Brook, N. J., a corporation of New York No Drawing. Application April 10, 1952,
Serial No. 281,662

2 Claims. (Cl. 71—2.2)

This invention relates to a method of defoliating cotton and other plants. The method of the invention gives optimum results in defoliating efficiency, non-flammability and ease of use.

This application is a continuation-in-part of application Serial No. 142,087 filed February 2, 1950, and all of the claims find support in the parent application.

It has been recognized that sodium and analogous chlorates per se are defoliants. U. S. Patent No. 2,368,275, for example, claims a method of defoliating cotton by the application of ten to 150 pounds per acre. It has also been recognized that sodium chlorate greatly accelerates the burning of inflammable matter. For this reason the use of a sodium chlorate alone as a defoliant, especially in the amount recommended in the above patent, is too great a fire hazard to be practical. In addition the hazards of handling and using sodium chlorate alone in the agricultural field render its use undesirable.

It has also been recognized that borax ($Na_2B_4O_7$) imparts resistance to fire, and that inflammable materials treated with borax are less flammable. While this may suggest the addition of borax to sodium chlorate for the purpose of minimizing the fire hazard, the difficulty with this suggestion is that borax is not very soluble in water. If the sodium chlorate were used in a concentration of one pound per gallon, it would be possible to include only about ¼ pound of borax in the solution and this amount does not effect any substantial reduction in the fire promoting properties of the chlorate.

In accordance with U. S. Patent No. 1,925,628, the addition of boric acid to sodium chlorate is suggested. While the addition of boric acid to the sodium chlorate might be expected to impart some fire resistance to the material, its utility in this respect is limited by the fact that it, also, has a relatively low solubility in water.

It has been discovered in accordance with this invention that cotton and other plants may be defoliated with a mixture of sodium chlorate and a polyborate (as this is defined hereinafter) such as sodium pentaborate ($Na_2B_{10}O_{16}.10H_2O$). The polyborate is markedly more soluble than either ordinary borax or boric acid alone, and imparts pronounced fire resistance properties to plants sprayed with a chlorate composition containing such a borate.

The defoliant used in this method also is more soluble as to total amounts, and is more quickly soluble so as not to require long periods of stirring or other expedients for introducing the dry mixture into the solution before the defoliating process can be undertaken. This is important because the composition is preferably marketed in the dry form, and ease and quickness of solubility in the field in cold water is essential.

The defoliating method minimizes the fire hazard and permits the use of sodium chlorate an active ingredient of a defoliant in a uniformly effective and safe way at a reasonable cost. The composition used in the defoliating method is more effective than sodium chlorate alone. The composition can be used in my method in solution at the rate of from about 2 to 10 pounds per acre, as distinguished from ten to 150 pounds per acre recommended for sodium chlorate alone. This is attributed to the coaction of the two ingredients and in this respect the polyborate may be regarded as an active ingredient. The concentration of the composition is not critical as long as all the ingredients are in solution and the solution is uniformly applied such as by spraying.

In addition to causing the leaves of the plant to drop when applied to cotton so as to permit cotton picking by mechanical means, my method stimulates the growth of the plant causing unripe bolls to mature and open, thereby increasing the crop yield. The defoliating efficiency and satisfactory fire resistance has been amply demonstrated in extended commercial applications of the invention.

In order to understand the scope of the composition used in the defoliating method, it is pointed out that the various boric acids can be treated as combinations of $(H_2O)_x.B_2O_3)_y$ and that the various borates may be considered various combinations of $(Na_2O)_x.(B_2O_3)_y$, where x and y are small numbers. Thus, the ordinary ortho boric acid ($H_3BO_3$) can be considered as $$(H_2O)_3.B_2O_3)_1$$

Ordinary borax, also known as tetraborate, but more properly as biborate, can be considered $(Na_2O)_1.(B_2O_3)_2$, and the pentaborate may be considered $(Na_2O)_1.(B_2O_3)_5$. The pentaborate may also be considered as $$6H_3BO_3.Na_2B_4O_7$$

While the pentaborate has been referred to as a desirable ingredient, it will be obvious that in this series of compounds the ratio of the boric anhydride to the sodium oxide may vary, and it is intended to include those borates (and mixtures of them) having a higher proportion of boron to sodium than is present in ordinary borax and which fall within the following general formula: $(Na_2O)_1.(B_2O_3)_z$ where z is 4.16 to 7. These can be considered, for example, $Na_2B_{10}O_{16}$, $Na_2B_{12}O_{19}$, $Na_2B_{14}O_{22}$, and mixtures thereof when z is 5, 6 and 7 respectively. Thus, z will not be a whole number in the case of mixtures. Some of these borates with whole numbers may also be viewed as mixtures of other borates or of boric acid and borates.

The expression "polyborate" is used herein as indicating borates in which the boron ratio to sodium is in excess of that in the tertaborate (biborate) within the range of 4.16 to 7.

The following compositions of polyborates are illustrative of those that can be used in formulating a composition for practicing the invention:

| Composition | Percent Ratio | $Na_2O:B_2O_3$ Ratio | Remarks |
|---|---|---|---|
| 20.00% $Na_2B_4O_7.10H_2O$ | 1 | 1:4.16 | |
| 80.00% $Na_2B_{10}O_{16}.10H_2O$ | 4 | | |
| 16.67% $Na_2B_4O_7.10H_2O$ | 1 | 1:4.29 | |
| 83.33% $Na_2B_{10}O_{16}.10H_2O$ | 5 | | |
| 15.87% $Na_2B_4O_7.10H_2O$ | 1 | 1:4.32 | Example 4 of Table I. |
| 84.13% $Na_2B_{10}O_{16}.10H_2O$ | 5.30 | | |
| 14.29% $Na_2B_4O_7.10H_2O$ | 1 | 1:4.38 | |
| 85.71% $Na_2B_{10}O_{16}.10H_2O$ | 6 | | |
| 12.50% $Na_2B_4O_7.10H_2O$ | 1 | 1:4.46 | |
| 87.50% $Na_2B_{10}O_{16}.10H_2O$ | 7 | | |
| 11.11% $Na_2B_4O_7.10H_2O$ | 1 | 1:4.51 | |
| 88.89% $Na_2B_{10}O_{16}.10H_2O$ | 8 | | |
| .00% $Na_2B_4O_7.10H_2O$ | 0 | 1:5.00 | Example 3 of Table I. |
| 100.00% $Na_2B_{10}O_{16}.10H_2O$ | 100 | | |
| 82.68% $Na_2B_{10}O_{16}.10H_2O$ | 4.77 | 1:6.0 | |
| 17.32% $H_3BO_3$ | 1 | | |
| 70.47% $Na_2B_{10}O_{16}.10H_2O$ | 2.39 | 1:7.0 | |
| 29.53% $H_3BO_3$ | 1 | | |

To illustrate the fire resistance, compositions were made in which sodium chlorate was included in an amount of one pound per gallon of total solution. Included in one such solution was ordinary borax, in another solution boric acid was included, and in a third solution sodium pentaborate was included in accordance with the invention. In a fourth solution a mixture of the pentaborate and borax was included within the general formula given above. The amount of the boric acid and borate in each instance which was added to the sodium chlorate solution was that which would saturate the solution with the boron compound, because this is the condition that will obtain as the solution dries on the plant after spraying. Each of these compositions were tested for fireproofing properties and weed-killing properties, and the results are as follows:

TABLE I

| Example No. | Amount of Sodium Chlorate, lb./gal. | Boron Compound | Amount of Boron Compound to Saturate the Solution (lbs.) | Amount of $B_2O_3$ in Compound in Solution (lbs.) | pH of Solution | Fire proofing |
|---|---|---|---|---|---|---|
| (1) | 1 | $H_3BO_3$ | 0.51 | 0.29 | 4.0 | Poor. |
| (2) | 1 | $Na_2B_4O_7.10H_2O$ | 0.24 | 0.09 | 8.6 | Very poor. |
| (3) | 1 | $Na_2B_{10}O_{16}.10H_2O$ | 1.19 | 0.70 | 6.45 | Very good. |
| (4) | 1 | $(Na_2O).(B_2O_3)_{4.33}$ | *1.26 | 0.70 | 6.9 | Good. |

*This is equivalent to 1.06 lbs. of pentaborate and 0.20 lb. of borax per gallon.

From a consideration of the data in the above table it will be seen that when boric acid or borax is used in an amount to saturate the solution, the composition has poor fire resistance. This fire resistance is determined by saturating a piece of canvas in the solution, draining out the excess liquid, and drying the canvas. This is then ignited, and the piece which is characterized as having poor fire resistance ignites readily and burns completely, either as rapidly as, or more rapidly than, a similar piece of untreated canvas. The "good" characterization is applied to one which burns less rapidly than an untreated canvas, and where all flame and smoulder dies out before the entire canvas is consumed. "Very Good" applies to those cases where ignition is slow, and burning and smouldering dies out when one-third to one-half of the canvas is consumed. "Excellent" (as used later) applies in cases where flaming and smouldering dies out so rapidly that less than 10% of the canvas strip is consumed.

The composition in Example 3 which is used in accordance with the invention has very good fire resistant properties in that canvas so treated is more difficult to ignite, the flame produced dies out in just a few seconds after the igniting flame is removed, and smouldering continues for only about half a minute, leaving 75% of the original canvas untouched.

The composition of Example 4 is intermediate between borax and the pentaborate, and as explained in the footnote, may be considered a mixture of pentaborate and borax. This composition, nevertheless, is much more soluble than borax and, therefore, may be included in an amount to impart excellent fireproofing properties as shown.

In the following table the amount of chlorate is reduced one-half, namely one-half pound per gallon, and the amount of the boron compound is that to saturate the solution.

TABLE II

| Example No. | Amount of Sodium Chlorate, lb. | Boron Compound | Amount of Boron Compound to Saturate the Solution (lbs.) | Amount of $B_2O_3$ in Compound in Solution (lbs.) | pH of Solution | Fire proofing |
|---|---|---|---|---|---|---|
| (5) | ½ | $H_3BO_3$ | 0.54 | 0.30 | 3.8 | Good. |
| (6) | ½ | $Na_2B_4O_7.10H_2O$ | 0.31 | 0.11 | 8.8 | Fair. |
| (7) | ½ | $Na_2B_{10}O_{16}.10H_2O$ | 1.46 | 0.86 | 6.45 | Excellent. |

A comparison of Examples 3 and 7 shows that the very good fire resistance is improved. A larger amount of pentaborate is dissolved.

A comparison of Examples 1 and 5 shows that a slightly larger amount of boric acid can be dissolved in Example 5 and the fireproofing improved somewhat due to the lower amount of chlorate to accelerate burning in comparison with the amount of the boron compound. A comparison of Examples 2 and 6 shows that slightly more borax can be dissolved as the amount of chlorate is reduced and thus improves the fireproofing somewhat due also to the smaller amount of chlorate in relation to the amount of borax.

There is no critical pH figure due to the introduction of sodium borate salts. The pH is generally around 6 to 7 at dilutions ordinarily used in defoliating. The use of the pentaborate and other polyborates as defined herein does give a lower pH than the chlorate per se or a mixture with ordinary borax. There may be instances where considerations of solubility and reduction in fire hazard prompt the use of compounds in such amounts that the advantages of enhanced solubility and reduction in fire hazard justify a pH up to about 8.0.

As illustrative of an embodiment of the invention, plants may be defoliated with a solution of a mixture containing 45% sodium chlorate and 55% sodium pentaborate. The preferred proportions contain 25 to 60% of the chlorate and 75 to 40% pentaborate or other polyborate as defined herein.

The compositions to be used in practicing the invention may be made by the following methods. These methods are of interest since sodium pentaborate and similar borates when concentrated in a solution by evaporation and allowed to cool in the usual manner, form products which have a very fine crystalline structure, and the crystals show very little, if any, tendency to "grow" as is usual with most crystalline materials. Furthermore, due to the high solubility of sodium pentaborate, the mother liquor is very viscous and the usual methods of separating the crystals from the mother liquor, such as by draining or centrifuging, are difficult and uneconomical. If the mother liquor is concentrated to a point beyond that employed in a normal crystallizing concentration, a product may be obtained which is dry-appearing in form and with the correct quantity of water of crystallization, namely $Na_2B_{10}O_{16}.10H_2O$, in the case of the pentaborate. The sodium chlorate may be incorporated in the process at various points in the operation, thus producing a homogenous chlorate-borate material in which there is no segregation of the materials, which is an ideal material for use in practicing the invention.

The following examples illustrate the above described method:

*Example 8*

35½ pounds of regular commercial borax was dissolved in two gallons of boiling water. Immediately, 34½ pounds of 99½% boric acid (preferably powdered) was added. These quantities of the two boron compounds react to produce 55 pounds of sodium pentaborate (decahydrate). The mixture was heated with agitation until the temperature reached approximately 234° F. At this point, the heating was stopped and 45 pounds of sodium chlorate was added in a slow, continuous stream, and rabbled until completely cold. The resulting mix was 100 pounds of a dry-appearing product, friable and easily ground. At the temperature stated an amount of water will have been removed so that the amount remaining satisfied the water of crystallization of the pentaborate.

*Example 9*

As an alternative procedure, after the above quantities of borax and boric acid have been added to the boiling water, 45 pounds of sodium chlorate was added and heating continued until the boiling point reached approximately 268° F. At this point, the heating was stopped, and the mixture was agitated and rabbled in the same manner as before until cold. The resulting mix was 100 pounds of product practically identical with that obtained in Example 8.

*Example 10*

Example 8 was followed unitl the boiling point of the pentaborate solution reached approximately 234° F. At this point the heating was stopped, and the hot liquor was run into a rabbler containing 45 pounds of sodium chlorate, and rabbled until cold.

*Example 11*

Example 8 was followed until the boiling point of the pentaborate solution reached approximately 234° F. At this point the heating was stopped, and the mixture was agitated and rabbled until cold. The resulting mix was 55 pounds of sodium pentaborate decahydrate, which may then be mixed dry with 45 pounds of sodium chlorate. This is not a preferred procedure, because there will be a tendency for the dry components to segregate. This is not experienced with the products as obtained in Examples 8, 9 and 10.

*Example 12*

The same quantities of materials listed in Example 8 were dissolved in 45 gallons of cold water and used directly at this strength. Or the mixture was diluted to 100 gallons, for example, to obtain a concentration of one pound of desired material per gallon. Dry-mixing of the borax and boric acid before adding to the water speeds up the dissolving process.

*Example 13*

The quantities of materials used in Example 8 were mixed dry, and the resulting 115 pounds of dry mixture used as 100 pounds of the desired material, according to the following equation:

$$Na_2B_4O_7.10H_2O + 6H_3BO_3 = Na_2B_{10}O_{16}.10H_2O + 9H_2O$$

This reaction took place very slowly in the dry mixture at ordinary temperatures. When the mixture was placed in a closed container, a slight dampening took place within an hour, due to the liberation of water as shown. Within 24 hours the mixture became moist and started to cake, and within 48 hours it became a soggy mass.

When the original dry mixture was exposed to the air in a thin layer for several days, the evolved water evaporated without causing sogginess.

The expression "consisting essentially of" is used in this application to indicate that the sodium chlorate and the polyborate are the components essential to obtaining the advantages of the invention. This is meant to exclude from the composition only those ingredients which would nullify the advantageous properties of the composition, and not to exclude inert materials and other ingredients which may have no effect, or some other beneficial effect (such as a hydroscopic agent, wetting agent, etc.), without detracting from the advantages described herein, in accordance with the recognized meaning of this expression.

While the ingredients are described as the sodium salts, it will be obvious that the potassium salts and other salts of strong alkaline materials are the equivalents and may be used.

I claim:

1. A method of defoliating cotton and other plants which comprises applying thereto in the form of an aqueous solution and at a rate of 2 to 10 pounds per acre, a composition consisting essentially of 25 to 60% of sodium chlorate and 75 to 40% of a sodium polyborate of the general formula $Na_2O.(B_2O_3)_x$, where x is a number from 4.16 to 7.

2. A method of defoliating cotton and other plants which comprises applying thereto in the form of an aqueous soluation and at a rate of 3 to 8 pounds per acre, a composition consisting essentially of about 40 to 60% of sodium chlorate and about 60 to 40% of sodium pentaborate.

No references cited.